(12) United States Patent
Mallart et al.

(10) Patent No.: US 6,445,740 B1
(45) Date of Patent: Sep. 3, 2002

(54) AUDIOVISUAL DATA DECODING METHOD

(75) Inventors: Raoul Mallart, Paris; Julien Signes, Rennes, both of (FR)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/254,103

(22) PCT Filed: Jul. 6, 1998

(86) PCT No.: PCT/IB98/01036

§ 371 (c)(1),
(2), (4) Date: Mar. 1, 1999

(87) PCT Pub. No.: WO99/03069

PCT Pub. Date: Jan. 21, 1999

(30) Foreign Application Priority Data

Jul. 11, 1997 (EP) .............................. 97401690

(51) Int. Cl.[7] .................................. H04N 7/12
(52) U.S. Cl. .................................. 375/240.08
(58) Field of Search ...................... 382/243; 375/240.08

(56) References Cited

U.S. PATENT DOCUMENTS 5,838,830 A * 11/1998 Qian et al. .................. 382/243

OTHER PUBLICATIONS

ISO/IEC JTC1/SC29/WG11: "Generic Coding on AudioVisual Objects; Part 1: Systems; Section 9: Scene Description" Final Committee Draft of International Standard ISO/IEC 14496–1, May 18, 1998, pp. 40–150.*

Broll W et al.: "VRML: Today and 'Tomorrow" Computers and Graphics, vol. 20, No. 3, May 1996, pp. 427–434.*

* cited by examiner

Primary Examiner—Chris Kelley
Assistant Examiner—George A Bugg, Jr.
(74) Attorney, Agent, or Firm—Russell Gross

(57) ABSTRACT

The present invention relates to a method of decoding audio-visual data allowing to process, on the basis of an improved syntactic language, distinct elements of a scene as objects for which individual animations, particular interactions user/elements, and specific relations between the elements and the defined animations and/or interactions can be provided, the description being organized in a hierarchical tree also including transversal connections provided both for embedding bidimensional and/or tridimensional objects in each other and optionally controlling the rendering of scenes from various view points, while maintaining a control of all related actions both in the embedded objects and/or scenes and in the original ones.

5 Claims, 1 Drawing Sheet

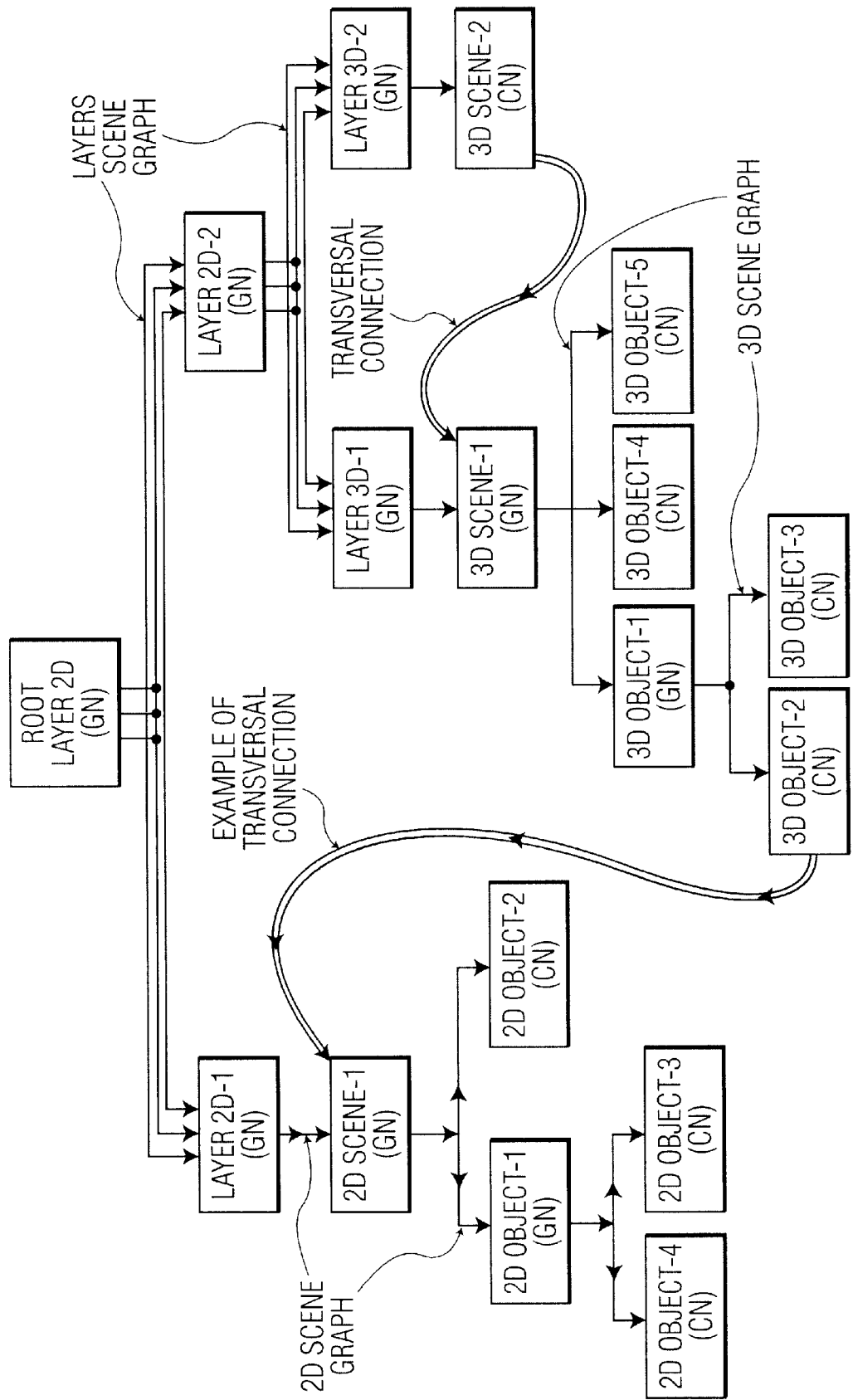

AUDIOVISUAL DATA DECODING METHOD

BACKGROUND OF THE INVENTION

1. Field of the Invention

The present invention relates to a method of decoding coded digital signals representative of audiovisual data and available in the form of a continuous bitstream, in view of the binary description of a scene to be rendered on a displaying device, said method comprising a processing operation based on an evolutive syntactic language and provided for extracting from said bitstream, in a first step, distinct elements called objects according to the structure of said scene, defining, in a second step, an individual animation of said elements of the scene, defining, in a third step, particular interactions between a user and said elements, and organizing, in a fourth step, specific relations between said scene elements and corresponding individual animations and/or user interactions according to various classes of applications. This invention will be mainly used in the future MPEG-4 decoders.

2. Description of the Related Art

The most important goal of the well-known MPEG-1 and MPEG-2 standards, dealing with frame-based video and audio, was to make storage and transmission more efficient by compressing the concerned data. The future new MPEG-4 decoding standard will be fundamentally different, as it will represent the audiovisual scenes as a composition of objects rather than pixels only. Each scene is defined as a coded representation of audiovisual objects that have given relations in space and time, whatever the manner in which said given scene has been previously organized in these objects (or segmented).

Up to now, the standardization bodies dealing with natural and synthetic sources used to be different. As good three-dimensional (3D) capabilities are becoming an increasingly important part of many fields, including multimedia and World Wide Web applications that use VRML (VRML—or Virtual-Reality Modelling Language—is now the standard for specifying and delivering 3D-graphics-based interactive virtual environments), the MPEG-4 standard considers jointly the natural materials (video, audio, speech) and the synthetic ones (2D and 3D graphics and synthetic sound) and tries to combine them in a standardized bitstream, in view of the presentation of such a multimedia content on a terminal screen. In order to compose this audiovisual information within the scene, their spatio-temporal relationship needs to be transmitted to the terminal.

The MPEG-4 standard defines a syntactic description language to describe the binary syntax of an audiovisual object's bitstream representation as well as that of the scene description information. More precisely, the MPEG-4 system Verification Model 4.0 proposes, for the description of the scenes, a binary format called the Binary Format for Scenes (BIFS). This description, constructed as a coded hierarchy of nodes with attributes and other information such as event sources and targets, is based on the assumption that the scene structure is transmitted as a parametric description (or a script) rather than as a computer program. The scene description can then evolve over time by using coded scene description updates. The node descriptions, which are conveyed in a BIFS syntax, may also be represented, for the purpose of clarity, in a textual form. Some MPEG-4 nodes and concepts are direct analogues of the VRML 2.0 nodes. Others are modified VRML 2.0, still others are added for specific NPEG-4 requirements. Like the VRML 2.0 syntax, the BIFS has provisions for describing simple behaviors and interaction with the user through an event passing mechanism. However some problems, explained hereunder, are not solved by this format.

The first of these addressed problems concerns an unified description of a mixed 2D and 3D scene. There is indeed a fundamental difference between the description of a purely 3D scene, the description of a purely 2D scene, and the description of a mixel 2D/3D scene. In a 3D scene, the layering of the objects is based on the depth information. In 2D, the notion of depth is absent and the layering should be defined explicitly. Furthermore, mixing 2D and 3D objects may be accomplished in several ways:

(1) embedding of 3D objects in a 2D scene:
   (a) this is, for example, the case when one tries to render 3D objects in front of a 2D background: in this case, when the user navigates in the scene, the background does not move;
   (b) another example is an application in which the user interface contains 2D objects (such as, buttons or text) and a 3D viewer where the scene is rendered;

(2) embedding of 2D objects in a 3D scene:
   (a), this is for example, the case when one uses a video object as a texture map on 3D objects;
   (b) another example is a texture made of 2D graphic objects (a special case of this is an "active map", that is a 2D plane in 3D scene made of several composited 2D objects);

(3) these two schemes may be mixed recursively, for example, for embedding 3D objects in a 2D scene and using the resulting composition as a texture map on 3D objects (this may be used to simulate the reflection of a mirror);

(4) a last possibility is to view simultaneously, the same 3D scene from different view points.

At that moment, it is not possible to describe all these possibilities using a single scene graph. A scene graph is a tree that represents a scene by means of a hierarchy of objects called nodes. The scene is composed of grouping nodes and children nodes. The role of grouping nodes is to define the hierarchy and the spatial organization of the scene. Children nodes are the leaves of the tree. These nodes are used to define geometric objects, light sources as well as various types of sensors (objects that are sensitive to user interaction). Grouping nodes have children nodes. These children may be children nodes or other grouping nodes.

All nodes may have attributes which are called fields. The fields may be of any type. For example, sphere is a geometry node. It has a field that defines its radius. It is a single value field of type float (SFFloat). Children nodes of a grouping node are specified in a special field. This field is a multiple value field (a list of nodes), and each value is of type node (MFNode).

Now, in order to define animations and user interaction in the scene, it is possible to make connection between fields using an event passing mechanism called routing. Routing a field A to a field B means that whenever field A changes, field B will take the same value as field A. Only fields of the same type (or the same kind) may be connected. Fields may be specialized: some may only be the destination of a route, they are called eventIn, others may only be at the origin of a route, they are called eventOut, others may be both the origin and destination of routes, they are called exposed-Field and, at last, others may not be connected, they are simply called field.

In VRML, four nodes (Viewpoint, Background, Fog and NavigationInfo) play a special role in the sense that only one of each may be active at a given time. These nodes are said to be bindable nodes.

There are many reasons to try to integrate both 2D and 3D features in one coherent framework:

- it is possible to use the same event passing mechanism for the whole 2D/3D scene;
- the representation of content can be more compact;
- the implementation can be optimized because 2D and 3D specifications have been designed to work together.

In order to fulfill these requirements, one needs to be able to compose, in a 2D space, 2D and 3D layers representing the result of the rendering of a 2D or a 3D scene, as well as using the result of rendering of a 2D or 3D scene as an input to other nodes in the scene graph.

Other problems, not still solved, have also to be considered, especially the following ones:

(1) interactivity with the 2D objects: it may be necessary to be able to interact with the objects, change the layering, add or remove objects, which is not possible without a method to set the depth of a 2D object that is compatible with the event passing mechanism of VRML 2.0;

(2) single event routing mechanism, in order to be provided with interactivity and simple behavior capabilities: an example of this could be the display of a 2D map in a walk through application, the map being used to navigate, which requires the capacity to route a user triggered event from a 2D object (the map) to the 3D scene (the view point);

(3) global hierarchy of the scene: while a scene graph representation involves a hierarchical organization of the scene, 2D or 3D layers should not be considered as other graphic objects, and mixed with the global scene graph (moreover, layers may be hierarchical, as illustrated for instance in the layer graph of FIG. 1, explained later);

(4) interactivity with video objects: one of the features of MPEG-4 video is an object level interaction, i.e., the description of video as a set of objects rather than a set of pixels, which allows the interaction with the content of the video (such as cut and paste of an object within a video) and needs to be defined for each application by the content creator (said interaction, being not a feature of the terminal itself, may be described by means of BIFS, but, for this, the composition of the various video objects has to be described in the BIFS itself).

SUMMARY OF THE INVENTION

It is therefore an object of the invention to provide an enhancement of the BIFS in order to fully describe the composition of complex scene built from both 2D and 3D objects. This enhancement allows a unified representation of the complete scene and its layout, as well as event passing not only within the 3D scene (as in VRML 2.0) but also between 2D and 3D nodes, and also allows the definition of specific user interfaces that may be transmitted with the scene, rather than the use of a default user interface provided by the terminal.

To this end, the invention relates to a method as described in the preamble of the description and which is further characterized in that said processing operation also includes an additional step for describing a complex scene, built from any kind of bidimensional and tridimensional objects, according to a framework integrating both bidimensional and tridimensional features and unifying the composition and representation mechanisms of the scene structure.

More precisely, said framework may be characterized in that said additional description step comprises a first main sub-step for defining a hierarchical representation of said scene according to a tree structure organized both in grouping nodes, that indicate the hierarchical connections giving the spatial composition of the concerned scene, and in children nodes, that constitute the leaves of the tree, and a second auxiliary sub-step for defining, possible transversal connections between any kind of nodes.

In an advantageous embodiment of the proposed method, the nodes of the tree structure comprise at least bidimensional and tridimensional objects, and the auxiliary definition sub-step comprises a first operation for embedding at least one of said bidimensional objects within at least one of said tridimensional objects, an optional second operation for defining transversal connections between said tridimensional and bidimensional objects, and an optional third operation for controlling the definition step of at least one individual animation and/or at least one particular interaction both in the embedded bidimensional object(s) and in the corresponding original one(s).

In another advantageous embodiment of the method, the nodes of the tree structure comprise at least bidimensional and tridimensional objects, and the auxiliary definition sub-step comprises a first operation for embedding at least one of said tridimensional objects within at least one of said bidimensional objects, an optional second operation for defining transversal connections between said bidimensional and tridimensional objects, and an optional third operation for controlling the definition step of a least one individual animation and/or at least one particular interaction both in the embedded tridimensional object(s) and in the corresponding original one(s).

In another advantageous embodiment of the method, the nodes of the tree structure comprise at least tridimensional objects, and the auxiliary definition sub-step comprises a first operation for embedding at least one of said tridimensional objects within at least one of anyone of said tridimensional objects, an optional second operation for defining transversal connections between said tridimensional objects, and an optional third operation for controlling the definition step of at least one individual animation and/or at least one particular interaction both in the embedded tridimensional object(s) and in the corresponding original one(s).

Whatever these two last embodiments, it can be noted that said auxiliary definition sub-step may also comprise an additional operation for controlling the simultaneous rendering of at least one single tridimensional scene from various viewpoints while maintaining the third operation for controlling the definition step of the individual animation(s) and/or the particular interaction(s).

The invention relates not only to the previously described method, with or without the optional operations, but also to any signal obtained by implementing such method in any one of its variants. It is clear, for instance, that the invention relates to a signal obtained after having extracted from the input bitstream, in a first step, distinct elements called objects according to the structure of a scene, defined, in a second step, an individual animation of said elements of the scene, defined, in a third step particular interactions between a user and said elements, organized, in a fourth step, specific relations between said scene elements and corresponding individual animations and/or user interactions according to various classes of applications, and carried out an additional step for describing a complex scene, built from any kind of bidimensional and tridimensional objects, according to a framework integrating both bidimensional and tridimensional features and unifying the composition and representation mechanisms of the scene structure.

Such a signal allows to describe, together, bidimensional and tridimensional objects, and to organize a hierarchical representation of a scene according to a tree structure, itself organized in grouping nodes defining the hierarchical connections and in children nodes, said nodes allowing to form together a single scene graph constituted of a 2D scene graph, a 3D scene graph, a layers scene graph, and transversal connections between nodes of this scene graph.

Such a signal also allows to define 2D or 3D scenes already composed or that have to be composed on a screen, with a representation of their depth, or to define 3D scenes in which will be embedded other scenes already composed of 2D or 3D objects, or also to define textures for 3D objects themselves composed of other 3D or 2D objects. In fact, such a signal allows to interact with any 2D or 3D object of the scene and to organize any kind of transmission of data between all these objects of the scene. Obviously, the invention also relates to a storage medium for memorizing said signal, whatever its type or its composition. Finally, the invention also relates to a device for displaying or delivering in any other manner graphic scenes on the basis of signals such as described above, in order to reconstruct any kind of scene including bidimensional and tridimensional objects.

BRIEF DESCRIPTION OF THE DRAWING

The particularities and advantages of the invention will become more apparent from the following description and the accompanying drawing, in which the sole FIG. 1 is a complete scene graph example.

DESCRIPTION OF THE PREFERRED EMBODIMENT

The scene graph of FIG. 1 shows a hierarchical representation of said scene, according to a tree structure. This structure is a hierarchy of layers that represent rectangular areas of the screen of a displaying device, and said hierarchy is organized in nodes (either in grouping nodes GN defining the hierarchical connections or in children nodes CN that are the leaves of the tree), with, according to the invention, possible transversal connections between these nodes (in FIG. 1, for example between the child node 3D Object-2 and the grouping node 2D Scene- 1, for illustrating the situation where a 3D object includes a 2D scene, or between the grouping nodes 3D Scene-2 and 3D Scene-1, for illustrating the situation where two "Layer3D" include the same 3D scene seen from different viewpoints).

In said illustrated scene graph, three different scene graphs are in fact provided: the 2D graphics scene graph, the 3D graphics scene graph, and the layers scene graphs. As shown in the picture, the 3D layer-2 views the same scene as 3D-layer-1, but the viewpoint may be different. The 3D object-3 is an appearance node that uses the 2D-Scene 1 as a texture node.

The principle of the invention is to provide new nodes that unify the description of the 2D/3D composition as a single graph.

First two new nodes are defined in order to describe the hierarchy of 2D and 3D layers. The 2D an 3D layers are composited as a hierarchical set of rendering areas that are 2D planes:

Layer2D: children nodes of layer 2D can be a Layer2D, Layer3D, and all nodes acceptable for a 2D scene description;

Layer3D: children nodes of layer 3D can be a 2D or a 3D Layer and a scenegraph describing a 3D scene.

Two new nodes are also defined in order to be able to use 2D and 3D composited scenes as input for a texture in a 3D world, to be mapped on a 3D object:

Composite2DTexture: this is a texture map containing as children nodes a 2D scene, and the composited 2D scene is used as the texture map;

Composite3DTexture: this is a texture map containing children nodes defining a 3D scene. The composited 3D scene is used as the texture map. It is in particular possible to use this node to map the result of the rendering of an existing 3D scene viewed from another view point. This node is useful to simulate reflection effects for instance.

A useful special case of the above is when a composited 2D scene is mapped on a rectangle in the 3D space. This can be seen as an "active map" inserted in the 3D space. Because the implementation of such a node can be very different from the implementation of the Composite Texture2D node, it is meaningful to design a specific node for this case. An ActiveMap node is thus proposed in the following of the description.

Finally, in order to route pre-defined values of the viewpoint or other bindable children nodes to one of the above quoted nodes, a specific Valuator node is defined. This node can be used in a broader scope in the BIFS specification, or could be defined as a compliant VRML 2.0 prototype.

The principle of the invention having been explained, definition and semantic of these new nodes will now be more precisely indicated in the following paragraphs (A) (F) to.

(A) Layer2D Definition and Semantic

The layer2D node is defined as a grouping node. It defines an area on the screen where 2D objects will be rendered. Three fields (or attributes) describe how this node will be rendered with respect to other objects its size, its position and its depth. These fields may be the origin or the destination of routes. They are thus exposedFields. This Layer2D node may be the parent of other nodes of the same type (i.e., also Layer2D) or of a similar type defined below (Layer3D). This may be described by a multiple value field of type node (MFNode). Besides, this node may be the parent of nodes representing 2D objects. This also may be described by a multiple value field of type node (NFNode).

In the BIFS language, the Layer2D node is described as follows:

```
Layer2D {
        exposedField    MFNode     children2D        []
        exposedField    MFNode     childrenLayer     []
        exposedField    SFVec2i    size              -1 -1
        exposedField    SFVec2i    translation       0 0
        exposedField    SFFloat    depth             0
}
```

The children2D field can have, as value, any 2D grouping or children nodes that defines a 2D scene. The childrenLayer field can take either a 2D or 3D layer node as value. The ordering (layering) of the children of a Layer2D node is explicitly given by the use of transform2D nodes. If two 2D nodes are the children of a same Transform2D, the layering of 2D nodes is done in the order of the children in the children field of the Transform2D.

The layering of the 2D and 3D layers is specified by the translation and depth fields. The size parameter is given in floating point number, and may be expressed in pixels, or between 0.0 and 1.0 in "graphics meters", according to the context. The same goes for the translation parameter. A size of −1 in one direction means that the Layer2D node is not specified in size in that direction, and that the viewer would decide the size of the rendering area.

All the 2D objects under a same Layer2D node form a single composed object. This composed object is viewed by other objects as a single object. In other words, if a Layer2D node A is the parent of two objects B and C layered one on top of the other, it will not be possible to insert a new object D between B and C unless D is added as a children of A.

(B) Layer3D Definition and Semantic

Similarly, the Layer3D node is defined as a grouping node. It defines an area on the screen where 3D objects will be rendered. Three fields (or attributes) describe how this node will be rendered with respect to other objects : its size, its position and its depth. These fields may be the origin or the destination of routes. They are thus exposedFields. This node may be the parent of other nodes of the same type (i.e., Layer3D) or of a similar type (Layer2D). This may be described by a multiple value field of type node (NIFNode). Besides, this node may be the parent of nodes representing 3D objects. This also may be described by a multiple value field of type node (MFNode).

In the special case where several views of the same 2D world (or object) are needed. bindable nodes pose a problem because it is no longer possible to say that only one of each may be active at the same time in the whole application. However, only one of each may be active in each Layer3D. This behavior requires that the Layer3D node has an exposed Field for each of the bindable node.

In the BIFS language, the Layer 3D node is described as follows:

```
Layer3D {
        exposedField   MFNode    children3D       []
        exposedField   MFNode    childrendLayer   []
        exposedField   SFVec2f   translation      0 0
        xposedField    SFInt32   depth            0
        exposedField   SFVec2f   size             -1 -1
        exposedIn      SFNode    background       NULL
        exposedIn      SFNode    fog              NULL
        exposedIn      SFNode    navigationInfo   NULL
        exposedIn      SFNode    viewpoint        NULL
}
```

The children3D field can have as value any 3D grouping or children nodes that define a 3D scene. The childrenLayer field can have either a 2D or 3D layer as values. The layering of the 2D and 3D layers is specified by the translation and depth fields. The translation field is expressed, as in the case of the Layer2D either in pixels or in "graphics meters", between 0.0 and 1.0. The size parameter has the same semantic and units as in the Layer2D. A size of −1 in one direction means that the Layer3D node is not specified in size in that direction, and that the viewer would decide the size of the rendering area. All bindable children nodes are used as exposedFields of the Layer3D node. At run-time, these fields take the value of the currently bound bindable children nodes for the 3D scene that is a child of the Layer3D node. This will allow to set a current viewpoint for instance to a Layer3D, in response to some event, which cannot be achieved by a direct use of the set_bind eventIn of the Viewpoint nodes, since scenes can be shared between different layers.

In the case where a 3D scene is shared between several Layer3D, the behaviour of the various Sensor nodes is defined as follows: a sensor triggers an event whenever the sensor is triggered in any of the Layer3D that contains it.

(C) Composite2DTexture Definition and Semantic

The composite2DTexture is a texture node as the VRML 2.0 Image Texture node. However, it is defined as a grouping node. It may be the parent of any 2D node. The texture represented by this node results from the composition of a 2D scene described in the children field.

In the BIFS language, the Composite2DTexture node is described as follows

```
Composite2DTexture {
        exposedField  MFNode    children2D  []
        exposedField  SFVec2f   size        -1 -1 }
```

The children2D field of type MFNode is the list of 2D grouping and children nodes that define the 2D scene to be mapped onto the 3D object. The size field specifies the size of this map. The unis are the same as in the case of the Layer2D/3D. If left as default value, an undefined size will be used. This composite2DTexture node can only be used as a texture field of an Appearance node.

(D) Composite3DTexture Definition and Semantic

The composite3DTexture is a texture node as the VRML 2.0 ImageTexture node. However, it is defined as a grouping node. It may be the parent of any 3D node. The texture represented by this node results from the composition of a 3D scene described in the children field. As for the Layer3D node, the issue of bindable nodes is solved using exposed fields.

In the BIFS language, the Composite3DTexture node is described as follows:

```
Composite3DTexture {
        exposedField   MFNode    children3D       []
        exposedField   SFVec2f   size             -1 -1
        exposedIn      SFNode    background       NULL
        exposedIn      SFNode    fog              NULL
        exposedIn      SFNode    navigationInfo   NULL
        exposedIn      SFNode    viewpoint        NULL
}
```

The children3D field of type MFNode is the list of 3D grouping and children nodes that define the 3D scene to be mapped onto the 3D object. The size field specifies the size in pixels of this map (if left as default value, an undefined size will be used). The four following fields represent the current values of the bindable children nodes used in the 3D scene. This Composite3DTexture node can only be used as a texture field of an Appearance node.

(E) CompositeMap Definition and Semantic

The CompositeMap node is a special case of the Composite2DTexture node that is represented in a rectangle of the z=0 plane of the local coordinate system. This useful subset of a Composite2DTexture node will enable to deal efficiently with many simple cases of combined 2D and 3D composition.

In the BIFS language, the ActiveMap node is described as follows:

```
CompositeMap {
    exposedField    MFNode      children2D    []
    exposedField    SFVec2i     sceneSize     -1 -1
    exposedField    SFVec2f     center        0 0
    exposedField    SFVec2f     mapSize       1.0 1.0
}
```

The children2D field of type MFNode is the list of 2D grouping and children nodes that define the 2D scene to be mapped onto the 3D object. The sceneSize field specifies the size in pixels of the 2D composited scene (if left as default value, an undefined size will be used). The center field specifies the coordinate of the center of the Composite Map in the xOy coordinate system. The mapSize field specifies the size in the 3D space measure of the rectangle area where the 2D scene is to be mapped. This node can be used as any 3D children node.

(F) Valuator Definition and Semantic

The Valuator node is a node used to route a pre-defined value to a field of another node. It has an exposedField of each existing type. The Valuator is triggered whenever one of its exposedField is modified or may be triggered through an eventIn.

In the BIFS language, the Valuator node is described as follows:

```
Valuator {
    eventIn         SFBool      set_Active
    exposedField    SFBool      boolValue       TRUE
    exposedField    SFColor     colorValue      0 0 0
    exposedField    SFFloat     floatValue      0.0
    exposedField    SFImage     imageValue      NULL
    exposedField    SFInt32     intValue        0
    exposedField    SFNode      nodeValue       NULL
    exposedField    SFRotation  rotationValue   1 0 0 0
    exposedField    SFVec2f     vec2fValue      0.0 0.0
    exposedField    SFVec3f     vec3FValue      0.0 0.0 0.0
}
```

The semantic of the parameter is simply a constant value holder. This value can be routed to another field of the same type to be able to set values to fields explicity. The routing can be activated with the eventIn set_Active field.

The above-described solution solves the adressed problems. A single representation for a complete 2D/3D scene and a global interactivity with 2D and 3D objects are indeed obtained, and since 2D and 3D objects are now described in a same file (or stream), it is possible to use the same routing mechanism between fields. An example of this functionality, in which, for a 3D scene composed of one cube and a color palette represented as 2D circles in a 2D scene, when the user touches a color in this palette, the cube color is set to the touched color, is given in the annex A.

Moreover, as shown in FIG. 1, the two nodes Layer2D and Layer3D have been designed to organize the scene in a single global hierarchy. It must also be indicated that 2D composited scenes as texture maps and 2D Composite maps are conceptually very similar. The Composite map defines a rectangular facet texture mapped with a 2D composited scene. The 2D composited scene as texture map is a texture that may be mapped on any geometry.

The annex B gives an example of a Composite map. In this example, one has at the origin of the world a 2.0×4.0 rectangular region on the ground composed of 2 images. The user may touch any of the 2 images to trigger an action (the actions are not specified in the example).

The annex C gives, for 3D composited scenes as texture maps, another example of a Composite map. In this example, one has a cube in a Layer3D. This cube has a texture map that is composed of the rendering of a cylinder viewed from a specified viewpoint. The user may touch the cylinder to trigger an action (the action is not specified in the example).

Concerning multiple views of a same scene, the proposed solution allows a same scene to be displayed in several Layer3D from different viewpoints. Besides, the viewpoint of this scene may be modified by touching some 2D image. This functionality is shown in the example given in the last annex D.

What is claimed is:

1. A method of decoding coded digital signals representative of audiovisual data and available in the form of a continuous bitstream in view of the binary description of a scene to be rendered on a displaying device, said method comprising a processing operation based on an evolutive syntactic language and including the steps:

extracting, from said bitstream, distinct elements called objects according to the structure of said scene;

defining an individual animation of said elements of the scene;

defining particular interactions between a user and said elements; and organizing specific relations between said scene elements and corresponding individual animations and/or user interactions according to various classes of applications;

wherein said processing operation further comprises an additional step of describing a complex scene, built from any kind of bidimensional and tridimensional objects, according to a framework integrating both bidimensional and tridimensional features and unifying the composition and representation mechanisms of the scene structure, wherein said additional step comprises a first main sub-step of defining a hierarchical representation of said scene according to a tree structure organized both in grouping nodes, that indicate the hierarchical connections giving the spatial composition of the concerned scene, and in children nodes, that constitute the leaves of the tree; and a second auxiliary sub-step of defining transversal connections between any kind of nodes.

2. A method according to claim 1, wherein the nodes of the tree structure comprise at least bidimensional objects and tridimensional objects, and the auxiliary sub-step comprises:

a first step of embedding at least one of said bidimensional objects within at least one of said tridimensional objects;

a second step of defining transversal connections between said tridimensional and bidimensional objects; and a third step of controlling the second defining step for at least one individual animation and/or at least one particular interaction both in the embedded bidimensional object(s) and in the corresponding original one (s).

3. A method according to claim 1, wherein the nodes of the tree structure comprise at least bidimensional and tridimensional objects, and the auxiliary sub-step comprises:

a first step of embedding at least one of said tridimensional objects within at least one of said bidimensional objects;

a second step of defining transversal connections between said bidimensional and tridimensional objects; and a third step of controlling the second defining step for a least one individual animation and/or at least one particular interaction both in the embedded tridimensional object(s) and in the corresponding original one(s).

4. A method according to claim 1, wherein the nodes of the tree structure comprise at least tridimensional objects, and the auxiliary sub-step comprises:

a first step of embedding at least one of said tridimensional objects within at least one of anyone of said tridimensional objects;

a second step of defining transversal connections between said tridimensional objects; and a third step of controlling the second defining step for at least one individual animation and/or at least one particular interaction both in the embedded tridimensional object(s) and in the corresponding original one(s).

5. A method according to claim 3, wherein said auxiliary sub-step also comprises an additional step of controlling the simultaneous rendering of at least one single tridimensional scene from various viewpoints, while maintaining the third step of controlling the second defining step of the individual animation(s) and/or the particular interaction(s).

* * * * *

UNITED STATES PATENT AND TRADEMARK OFFICE
CERTIFICATE OF CORRECTION

PATENT NO.     : 6,445,740 B1                                              Page 1 of 1
DATED          : September 3, 2002
INVENTOR(S)    : Raoul Mallart et al.

It is certified that error appears in the above-identified patent and that said Letters Patent is hereby corrected as shown below:

<u>Title page,</u>
Item [73], Assignee, should read as follows:
-- [73] Assignee:     Koninklijke Philips Electronics N.V., NewYork, NY (US);
                     France Telecom, Paris; Telediffusion De France, Paris
                     both of France (FR) --.

Signed and Sealed this

Twenty-sixth Day of August, 2003

JAMES E. ROGAN
*Director of the United States Patent and Trademark Office*